US008438104B2

(12) United States Patent
Aloni et al.

(10) Patent No.: US 8,438,104 B2
(45) Date of Patent: *May 7, 2013

(54) USING A TRANSACTION CARD ACCOUNT TO MAKE RECURRING LOAN PAYMENTS

(75) Inventors: Ruth L. Aloni, New York, NY (US); Rebecca R. Deen, Hoboken, NJ (US); Richard A. Exelbert, New York, NY (US); Elizabeth Langwith, New York, NY (US); Tamara F. Odinec, New York, NY (US); Joanne R. Pate, Middletown, NJ (US); Sheraz Shere, Brooklyn, NY (US); Natalie M. Sunderland, New York, NY (US); Ian Woolley, New York, NY (US)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/354,135

(22) Filed: Jan. 19, 2012

(65) Prior Publication Data
US 2012/0116962 A1  May 10, 2012

Related U.S. Application Data

(63) Continuation of application No. 11/642,956, filed on Dec. 21, 2006, now Pat. No. 8,117,116.

(60) Provisional application No. 60/753,398, filed on Dec. 27, 2005.

(51) Int. Cl.
*G06Q 40/00* (2012.01)

(52) U.S. Cl.
USPC ............... 705/38; 705/39; 705/40; 705/42

(58) Field of Classification Search ............... 705/38
See application file for complete search history.

(56) References Cited

U.S. PATENT DOCUMENTS

| | | | |
|---|---|---|---|
| 6,070,153 A * | 5/2000 | Simpson | 705/36 R |
| 6,208,978 B1 | 3/2001 | Walker et al. | |
| 6,304,860 B1 | 10/2001 | Martin, Jr. et al. | |
| 6,738,751 B1 | 5/2004 | Richiusa | |
| 6,793,131 B2 | 9/2004 | Hogan | |

(Continued)

OTHER PUBLICATIONS

"America Online to Launch AOL Cash Card Program for Teens", Business Wire News, New York: Jul. 22, 2003, p. 1.*

(Continued)

*Primary Examiner* — Hai Tran
(74) *Attorney, Agent, or Firm* — Snell & Wilmer L.L.P.

(57) ABSTRACT

Recurring loan payments (e.g., mortgage payments) through a transaction card account is disclosed. Information is received at a transaction account system from a loan company system corresponding to an application received at the loan company system from a requester for a loan involving automatic debits to a transaction card account. A determination is made as to whether the requestor is eligible for the loan to be associated with a transaction card account. If not, the customer receives a communication of rejection. If eligible, a determination is made whether the transaction account system has stored therein a transaction card account of the requester. If no, a transaction card account is opened for the requestor and associated with the loan. If yes, the loan payment is associated with the transaction card account bill.

15 Claims, 8 Drawing Sheets

U.S. PATENT DOCUMENTS

| | | | |
|---|---|---|---|
| 2002/0147680 A1 | 10/2002 | Cho et al. | |
| 2002/0169720 A1* | 11/2002 | Wilson et al. | 705/44 |
| 2003/0115126 A1 | 6/2003 | Pitroda | |
| 2003/0212630 A1 | 11/2003 | Kahr | |
| 2003/0233278 A1 | 12/2003 | Marshall | |
| 2005/0108132 A1* | 5/2005 | Doynow | 705/35 |
| 2005/0171901 A1 | 8/2005 | Rosenblatt et al. | |
| 2005/0247777 A1 | 11/2005 | Pitroda | |
| 2005/0283434 A1* | 12/2005 | Hahn-Carlson et al. | 705/39 |

OTHER PUBLICATIONS

USPTO; Office Action dated Apr. 25, 2008 in U.S. Appl. No. 11/642,956.

USPTO; Final Office Action dated Oct. 27, 2008 in U.S. Appl. No. 11/642,956.

USPTO; Advisory Action dated Jan. 26, 2009 in U.S. Appl. No. 11/642,956.

USPTO; Office Action dated Mar. 19, 2009 in U.S. Appl. No. 11/642,956.

USPTO; Final Office Action dated Oct. 8, 2009 in U.S. Appl. No. 11/642,956.

USPTO; Office Action dated Dec. 24, 2009 in U.S. Appl. No. 11/642,956.

USPTO; Final Office Action dated Jun. 22, 2010 in U.S. Appl. No. 11/642,956.

USPTO; Advisory Action dated Sep. 15, 2010 in U.S. Appl. No. 11/642,956.

USPTO; Office Action dated Oct. 28, 2010 in U.S. Appl. No. 11/642,956.

USPTO; Final Office Action dated Apr. 6, 2011 in U.S. Appl. No. 11/642,956.

USPTO; Advisory Action dated May 17, 2011 in U.S. Appl. No. 11/642,956.

USPTO; Office Action dated Aug. 30, 2011 in U.S. Appl. No. 11/642,956.

USPTO; Notice of Allowance dated Nov. 18, 2011 in U.S. Appl. No. 11/642,956.

* cited by examiner

USING A TRANSACTION CARD ACCOUNT TO MAKE RECURRING LOAN PAYMENTS

CROSS REFERENCE TO RELATED APPLICATIONS

This application is a continuation of, and claims priority to, U.S. Ser. No. 11/642,956 filed Dec. 21, 2006 and entitled "USING A TRANSACTION CARD ACCOUNT TO MAKE RECURRING LOAN PAYMENTS." The '956 application claims priority under 35 U.S.C. §119(c) to U.S. Provisional Application No. 60/753,398, filed Dec. 27, 2005. Both of which are incorporated by reference herein in their entirety.

BACKGROUND

1. Field of the Invention

The present invention generally relates to using a transaction card account to make recurring loan payments.

2. Related Art

Many loan companies (e.g., mortgage lenders) currently do not offer consumers the ability to make recurring loan payments (e.g., monthly mortgage payments) using a transaction card account. As a result, consumers are left with conventional payment vehicles, e.g., checks and electronic checks through Automated Clearing House (ACE), which may not be flexible, convenient and/or secure. For example, many consumers feel checks are inconvenient and often lead to late payments. With ACH, many consumers feel that providing checking account info and having money automatically deducted from checking accounts is not safe or reliable.

Given the foregoing, what is needed is a system, method and computer program product for using a transaction card account to make recurring loan payments.

BRIEF DESCRIPTION

The present invention meets the above-identified needs by providing a system, method and computer program product for using a transaction card account to make recurring loan payments.

In one embodiment, there is provided a method for using a transaction card account to make recurring loan payments comprising: receiving information at a transaction account system from a loan company system corresponding to an application received at the loan company system from a requester for a loan that has also requested having automatic debits to a transaction card account; determining if the requestor is eligible for the loan, which recurring payment is to be associated with a transaction card account corresponding recurring bill; determining, if eligible, whether the transaction account system has stored therein a transaction card account of the requestor, (is) if no, opening a transaction card account for the requestor and associating the transaction card account with the loan, and (ii) if yes, associating the loan with the transaction card account; and periodically debiting the transaction card account corresponding to a recurring loan payment amount for the loan.

In another embodiment, there is provided a system for using a transaction card account to make recurring loan payments comprising a controller, a storage device, and a comparing device. The controller receives information from a loan company system corresponding to an application received at the loan company system from a requester for a loan that has also requested having automatic debits to a transaction card account when a loan is approved by the loan company system. The storage device is coupled to the controller and stores information regarding individual transaction card accounts. The comparing device compares information received from the controller with the stored information to determine if the requestor is associated with one of the individual transaction card accounts and generates a result signal. The controller is configured to associate the loan with one of the individual transaction card accounts or to associate the loan with a new individual transaction card account based on the result signal. The controller is configured to perform the automatic debits to the associated transaction card account according to information received from the loan company system in a recurring amount value based on the loan.

In a further embodiment, the present invention provides a computer program product comprising a computer useable medium having computer program logic recorded thereon for controlling at least one processor. The computer program logic comprising computer program code modules that perform operations similar to the above-mentioned method and system embodiments.

Further features and advantages of the present invention as well as the structure and operation of various embodiments of the present invention are described in detail below with reference to the accompanying drawings.

BRIEF DESCRIPTION OF THE DRAWINGS

The features and advantages of the present invention will become more apparent from the detailed description set forth below when taken in conjunction with the drawings. The left-most digit of a reference number identifies the drawing in which the reference number first appears.

DETAILED DESCRIPTION

Overview and Terminology

Figure 1:
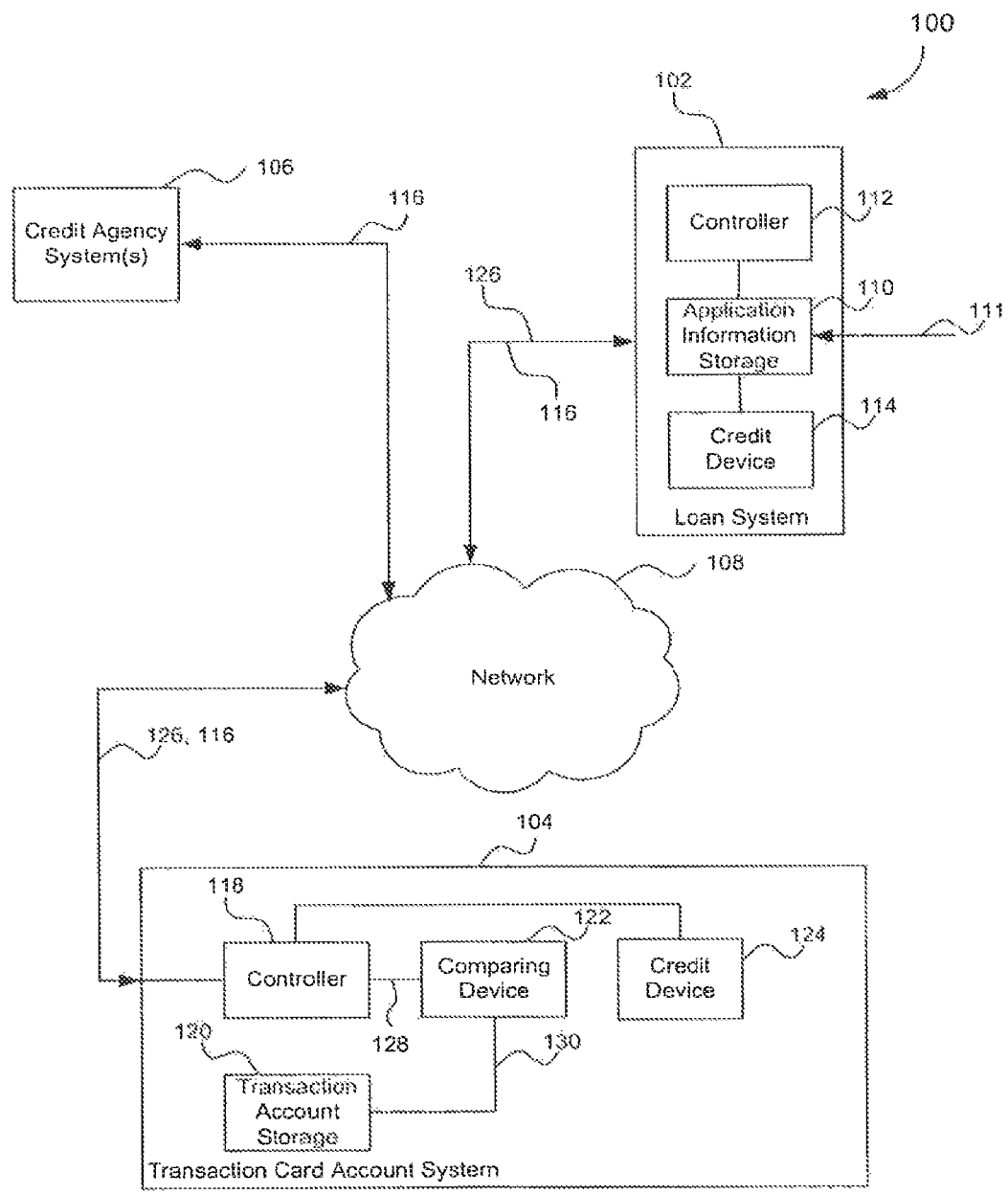
FIG. 1 is a system diagram, according to one embodiment of the present invention.

The present invention is directed to a system, method and computer program product for using a transaction card account to make recurring loan payments.

The present invention is now described in more detail herein in terms of the above exemplary description. This is for convenience only and is not intended to limit the application of the present invention. In fact, after reading the following description, it will be apparent to one skilled in the relevant art(s) how to implement the following invention in alternative embodiments.

The terms "member," "cardmember," "user," "end user", "consumer", "customer," "participant," etc., and/or the plural form of these terms are used interchangeably throughout herein to refer to those persons or entities capable of accessing, using, be affected by and/or benefiting from the tool that the present invention provides for searching credit reports using only a partial social security number and other identifying information.

Furthermore, the terms "business" or "merchant" may be used interchangeably with each other and shall mean any person, entity, distributor system, software and/or hardware that is a provider, broker and/or any other entity in the distribution chain of goods or services. For example, a merchant may be a grocery store, a retail store, a travel agency, a service provider, an on-line merchant or the like.

Transaction Accounts and Instrument

A "transaction account" as used herein refers to an account associated with an open account or a closed account system (as described below). The transaction account may exist in a physical or non-physical embodiment. For example, a transaction account may be distributed in non-physical embodiments such as an account number, frequent-flyer account, and telephone calling account or the like. Furthermore, a physical embodiment of a transaction account may be distributed as a financial instrument.

A financial transaction instrument may be traditional plastic transaction cards, titanium-containing, or other metal-containing, transaction cards, clear and/or translucent transaction cards, foldable or otherwise unconventionally-sized transaction cards, radio-frequency enabled transaction cards, or other types of transaction cards, such as credit, charge, debit, pre-paid or stored-value cards, or any other like financial transaction instrument. A financial transaction instrument may also have electronic functionality provided by a network of electronic circuitry that is printed or otherwise incorporated onto or within the transaction instrument (and typically referred to as a "smart card"), or be a fob having a transponder and an RFID reader.

Open Versus Closed Cards

"Open cards" are financial transaction cards that are generally accepted at different merchants. Examples of open cards include the American Express®, Visa®, MasterCard® and Discover® cards, which may be used at many different retailers and other businesses. In contrast, "closed cards" are financial transaction cards that may be restricted to use in a particular store, a particular chain of stores or a collection of affiliated stores. One example of a closed card is a pre-paid gift card that may only be purchased at, and only be accepted at, a clothing retailer, such as The Gap® store.

Use of Transaction Accounts

With regard to use of a transaction account, users may communicate with merchants in person (e.g., at the box office), telephonically, or electronically (e.g., from a user computer via the Internet). During the interaction, the merchant may offer goods and/or services to the user. The merchant may also offer the user the option of paying for the goods and/or services using any number of available transaction accounts. Furthermore, the transaction accounts may be used by the merchant as a form of identification of the user. The merchant may have a computing unit implemented in the form of a computer-server, although other implementations are possible.

In general, transaction accounts may be used for transactions between the user and merchant through any suitable communication means, such as, for example, a telephone network, intranet, the global, public Internet, a point of interaction device (e.g., a point of sale (POS) device, personal digital assistant (PDA), mobile telephone, kiosk, etc.), online communications, off-line communications, wireless communications, and/or the like.

System Overview

FIG. 1 shows a system 100, according to one embodiment of the present invention. System 100 comprises a loan system 102, a transaction card account system 104, and a credit agency system(s) 106. In one example, loan, transaction card account, and credit agency systems 102, 104, and 106 are coupled together and communicate with each other via a network 108. In other examples, loan, transaction card account, and credit agency systems 102, 104, and 106 are directly connected through a wired or wireless system for communications.

In one example, loan system 102 can be a mortgage system, or the like, that includes many different types of mortgage products. In one example, loan system 102 can include an application information storage 110 that receives and stores information or data signal 111 (e.g., financial, personal, demographic, etc. information) from a requestor of a loan. This information signal 111 may also include information relating to what type of loan product the requestor is applying for, and whether the requestor wants to pay the loan product through a new or old transaction card account, which is described in more detail below.

In this example, loan system 102 also includes a controller 112 and a credit device 114. In various examples, controller 112 can be a processor, a microprocessor, a digital signal processor, or the like. In one example, controller 112 processes the loan application information 111. In various examples, the loan application can be automatically processed by the controller 112 to generate a decision or the information 111 can be processed by the controller 112 to place it in a form to later be manually reviewed by an application officer. In either example, processing of the loan application information 111 may include controller 112 initiating communication between credit device 114 and credit agency system 106 to retrieve credit information 116 from credit agency system 106. It is to be appreciated that one or more credit agency systems 106 can be used to retrieve credit information 116, as would be known to a skilled artisan. In one example, credit information 116 is processed by controller 112 in conjunction with application information 111 to determine whether a loan product should be approved, for example using any process known to a skilled artisan.

In one example, transaction card account system 104 can include a controller 118, a transaction card account storage 120, a comparing device 122, and an optional credit device 124. In various examples, controller 118 can be a processor, a microprocessor, a digital signal processor, or the like.

In one example, when a requestor of the loan product also requests that the loan be paid through debits to a transaction card account, controller 118 receives a signal 126 from loan system 102. In various examples, signal 126 can include loan product information, the credit determination information, the requestor's information, and/or other information. Controller 118 processes information signal 126 and generates a signal 128 that is transmitted to comparing device 122. Comparing device 122 compares the information in signal 128 to information in storage 120 to determine if the requestor already has a transaction card account established in the transaction card account system 104. If an account is already established for the requestor, the loan product is associated with this account for the future periodic recurring loan payments that gill be debited to the transaction card account. If an account is not already established for the requestor, controller 118 processes a portion of the received information 126 and transmits information signal 130 to storage 120 to establish a transaction card account for the requestor. Transaction card account system 104 then generates and forwards a new transaction card to the requestor.

In one example, credit device 124 is optional, because transaction card account system 104 can base its decision on whether or not to allow association of the loan with a transaction card account on the credit determination information portion of signal 126 from loan system 102. In other examples, when credit device 124 is used, transaction card account system 104 can make its own eligibility determination. In this latter example when credit device 124 is used, controller 118 initiates communication between credit device 124 and credit agency 106, possibly via network 108, to retrieve credit information 116 corresponding to the requestor. Then, controller 118 forwards the retrieved credit information 116 to credit device 124 to determine if the requestor is eligible for associating a transaction card with the loan. Once approved, then controller 118 generates and transmits signal 130 to storage 120, which establishes a transaction card account for the requestor in storage 120.

In one example, once it is either established that a transaction card account already exists for the requestor or a new transaction card account is associated with the requestor, transaction card account system 104 communicates with loan system 102. This communication is to verify that the customer has accepted and enrolled in a program that would allow the automatic periodic payments of the recurring loan account value through debits to their transaction card account. Once established, the automatic debits can begin. These debits are automatically posted to the transaction card account similar to any other transaction associated with the transaction card account.

In one example, a customer receives a corresponding number of award or loyalty points, or the like, for each dollar of the recurring loan account value.

In one example, loan and transaction card account systems 102 and 104 can be computer systems having underlying software or they can be software on a computer system. Thus, loan and transaction card account systems 102 and 104 can therefore be hardware, software, firmware, or a combination thereof. Thus, the use of "device" throughout this description can be a hardware device or a software module that performs a described function.

In various examples, network 108 can be a wired or wireless network that allows for transmission of information between loan, transaction account, and credit agency systems 102, 104, and 106. For example, network 108 can be a wide area network (WAN), local area network (LAN), Ethernet, Internet, Intranet, Extranet, etc.

In one example, system 100 can performed a process that can be referred to as Mortgage Payment on the Card ("MPOC") for a specially-created mortgage product (or line of products), created just for the purpose of making monthly mortgage payments on the card (i.e., a transaction card account). Loan system 102 (e.g., mortgage lender partners of the transaction card account company system 104) would offer consumers this line of products that would have certain loan characteristics and added features, including a transaction card account (e.g., an American Express card account) that is used for each monthly mortgage payment. Alternatively, system 100 can perform a process referred to as Mortgage Payment on the Card ("MPOC") for a specially-created program in which mortgage lenders offer consumers the option of making monthly mortgage payments on the card (i.e., trans card account) for a subset of their existing mortgages. Loan system 102 would offer customers this line of mortgages that has the unique feature or allowing a transaction card account (e.g., an American Express card account) for making monthly mortgage payments. In one example, by using a transaction card account, consumers would be able to obtain the rewards/loyalty points associated with their transaction card for each monthly mortgage payment.

As discussed above, in order to be eligible for this service, consumers need to have a card on the transaction card account network and they have to enroll in automatic recurring billing. If non-cardmembers apply for the product, they will be issued, as discussed above, a new transaction card, e.g., a Preferred Rewards Gold Card from American Express Company of New York, N.Y., to make their monthly mortgage payments.

In one example, incremental closing costs or fees will be retained by the mortgage lender system 102. These fees may be charged in one lump sum at closing or they may be charged on an annual basis over the life of the mortgage. Alternatively, the fees may be charged half initially and half over the life of the loan. Additionally, or alternatively, fees may be charged on a monthly basis over the life of the mortgage.

In one example, a special process may be implemented in the case of "spend disruption" (e.g., failure to pay a required amount on the transaction card account during a billing cycle) in which: 1) loan system 102 is notified by transactions card account system 104 when the customer does not properly pay their transaction card account, such that loan system 102 can obtain an alternative form of payment.

In one example, the transaction card account company may provide monetary incentives to the loan company for acquiring new customers and allowing them to put the recurring loan payment to be made on the transaction card account. In various examples, remuneration may be made to mortgage lender partners in the form of a bounty for new card acquisitions. In various examples, the transaction card account company may have different settlement options fix different mortgage lender partners.

In one example, the mortgage line of products will consist of a variety of common mortgage types. The interest rates and closing costs will be competitive with the best available rates. The approval process for the loan will be quick and easy. Monthly payments will be charged automatically to a transaction card (e.g., an American Express credit or charge card).

As discussed above, through use of the above system 100, customers can earn loyalty or rewards points associated with their transaction card for each monthly mortgage payment. For example, if their monthly mortgage payment is $2,000, they can earn 2,000 points per month or 24,000 points per year. Their monthly mortgage payment will be automatically made through their transaction card, allowing them to: save time preparing payments and balancing their bank statement, eliminate the chance of late payment, and/or consolidate bill payments and keep track of mortgage payments online. In addition to these benefits, consumers who close a loan through the program will also receive an exclusive assortment of home-related offers. No additional interest will be charged on the transaction card provided their card is paid in full by the payment due date.

Process Overview

FIGS. 2, 3, 4, 5, 6, and 7 are flowcharts illustrating various processes, according to various embodiments of the present invention. In one example, these processes can be performed using system 100.

Figure 2:
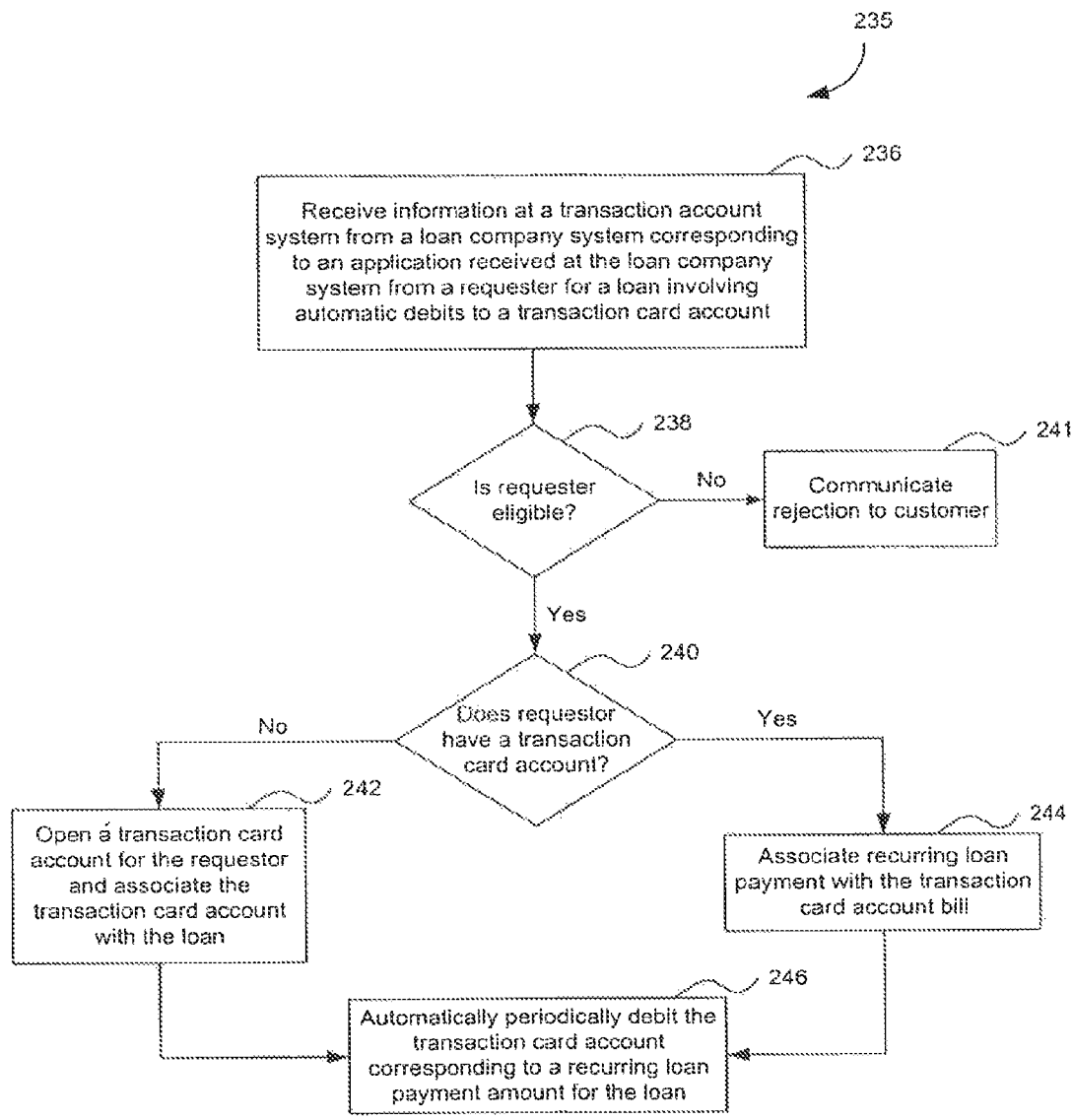
FIGS. 2, 3, 4, and 5 are flowcharts illustrating various processes, according to various embodiments of the present invention.

FIG. 2 shows a flowchart depicting a method 235. For example, method 235 can be a method for using a transaction card account to make recurring loan payments. In step 236, information is received at a transaction account system from a loan company system corresponding to an application received at the loan company system from a requester for a loan involving automatic debits to a transaction card account. In step 238, a determination is made as to whether the requestor is eligible for the loan to be associated with a transaction card account. If not eligible in step 238, in step 241 the customer receives a communication of rejection. If eligible in step 238, in step 240 a determination is made whether the transaction account system has stored therein a transaction card account of the requestor. If no in step 240, in step 242 a transaction card account is opened for the requestor and associated with the loan. If yes in step 240, in step 244 the loan payment is associated with the transaction card account bill, as discussed elsewhere. In step 246, periodic debits to the transaction card account are automatically made that correspond to a recurring loan payment amount for the loan.

In various examples, step 238 is either performed based on information from the loan company system, based on information generated by the transaction card account company, or based on information from both the loan company system and the transaction card company system.

In one example, method 235 periodically stores a respective reward value or a loyalty point value associated with the recurring loan payment amount in the transaction card account.

In one example, the recurring loan payment is a mortgage payment.

In an alternative embodiment, method 235 may only comprise associating a mortgage product with the transaction card account and automatically periodically debiting the transaction card account with the mortgage payment amount, e.g., steps 240, 242, 244, and 246.

Figure 3:
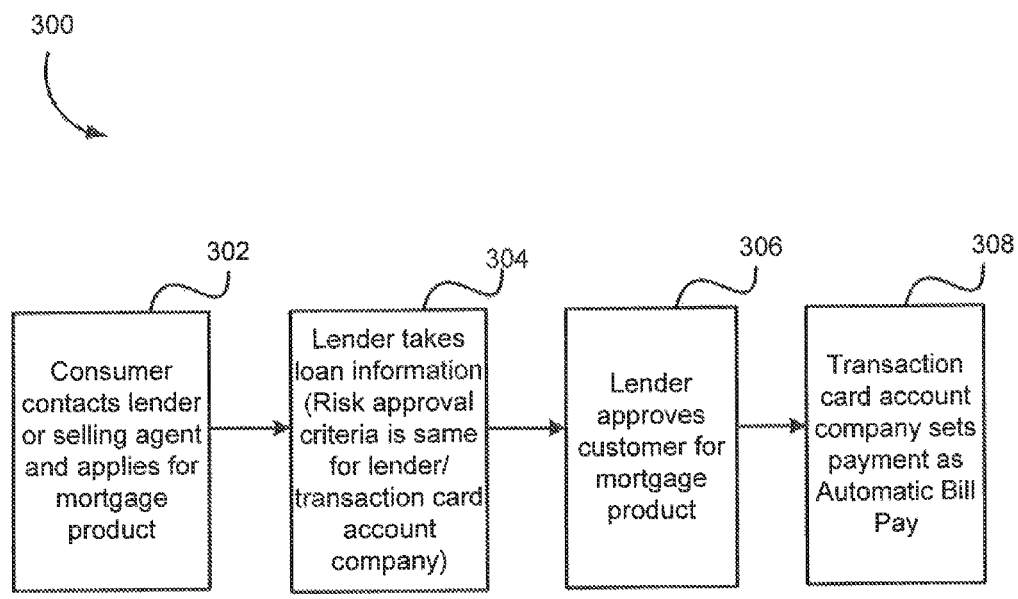

FIG. 3 shows a flowchart depicting a method 300. In one example, method 300 is a method for using a transaction card account to make recurring loan payments, e.g., mortgage payments. In this embodiment, the customer is known to be a transaction card holder of a transaction card company associated with or partnering with a mortgage company accepting a mortgage application. In step 302, a consumer contacts a lender or selling agent of the mortgage company and applies for a mortgage. In step 304, the lender takes loan information (e.g., financial, personal, demographic, etc. information of the customer). In one example, risk approval criteria can be the same for the lender and a transaction card company. In step 306, after an automated or manual evaluation of the loan application, the lender approves the customer for a mortgage product. In step 308, the transaction card company is contacted and sets a mortgage payment as an automatic bill pay process.

Figure 4:
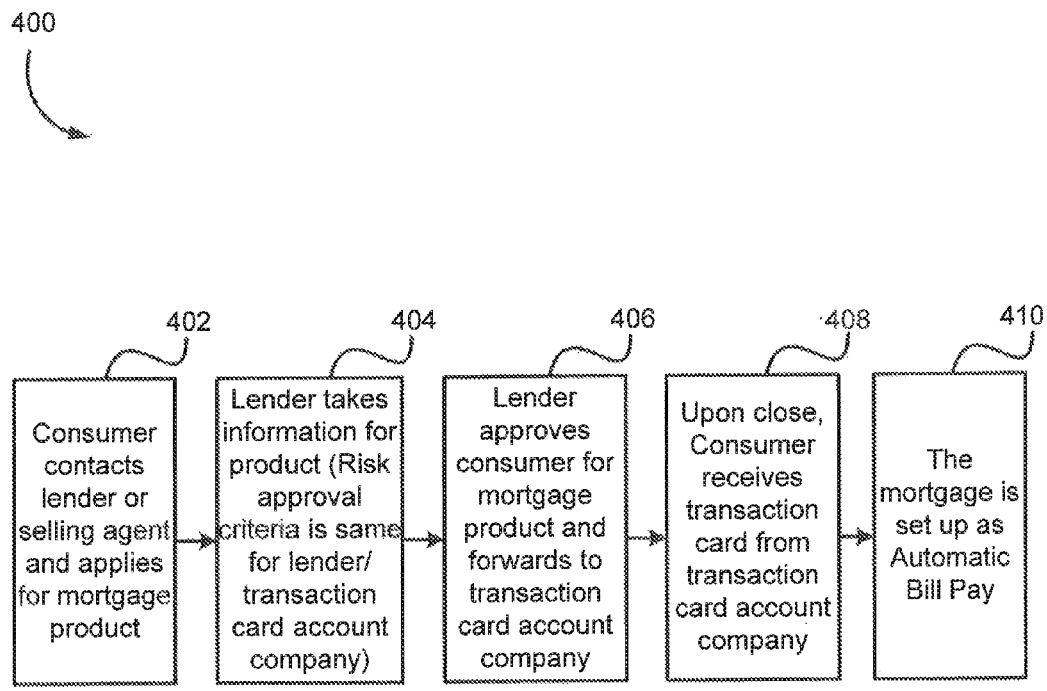

FIG. 4 shows a flowchart depicting a method 400. In one example, method 400 is a method for using a transaction card account to make recurring loan payments, e.g., mortgage payments. In this embodiment, the customer is known to not be a transaction card holder of a transaction card company associated with or partnered with a mortgage company accepting a mortgage application. In step 402, a consumer contacts a lender or selling agent of the mortgage company and applies for a mortgage. In step 404, the lender takes loan information, similar to above. In one example, risk approval criteria can be the same for the lender and a transaction card company. In step 406, after an automated or manual evaluation of the loan application, the lender approves the customer for a mortgage product and forwards the customer's information to the transaction card company. In step 408, upon closing of the mortgage, the transaction card company establishes a new transaction card account for the customer. In step 410, the transaction card account company sets a mortgage payment as an automatic bill pay process.

Figure 5:
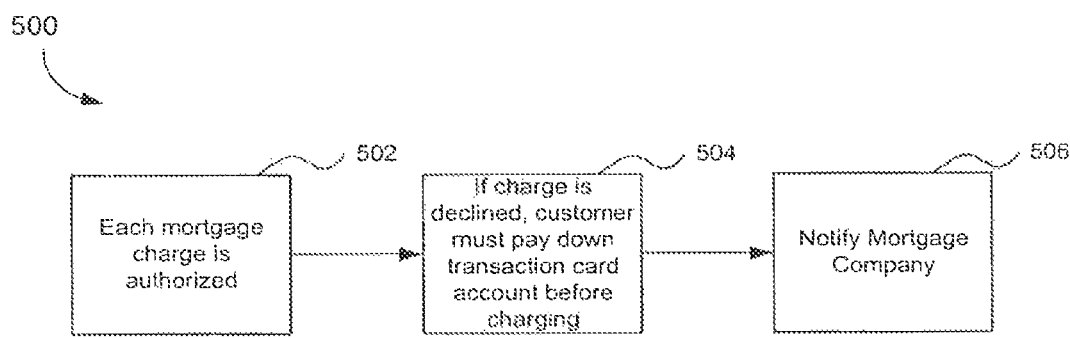

FIG. 5 shows a flowchart depicting a method 500. For example, method 500 can be used to make sure the transaction card account bills are being paid and to alert the mortgage company if they are not. In step 502, each mortgage charge to the transaction card account is authorized by the mortgage company. In step 504, the transaction card company declines the mortgage charge and asks the customer to pay down the transaction card account before more charges can be posted to it. This can be for several reasons, for example the customer is in default or at/over their credit limit on their transaction card account. In an optional step 506, transaction card company can alert the loan system company that the charge was not accepted and that the mortgage company should contact the customer directly to pay the mortgage payment.

Figure 7:
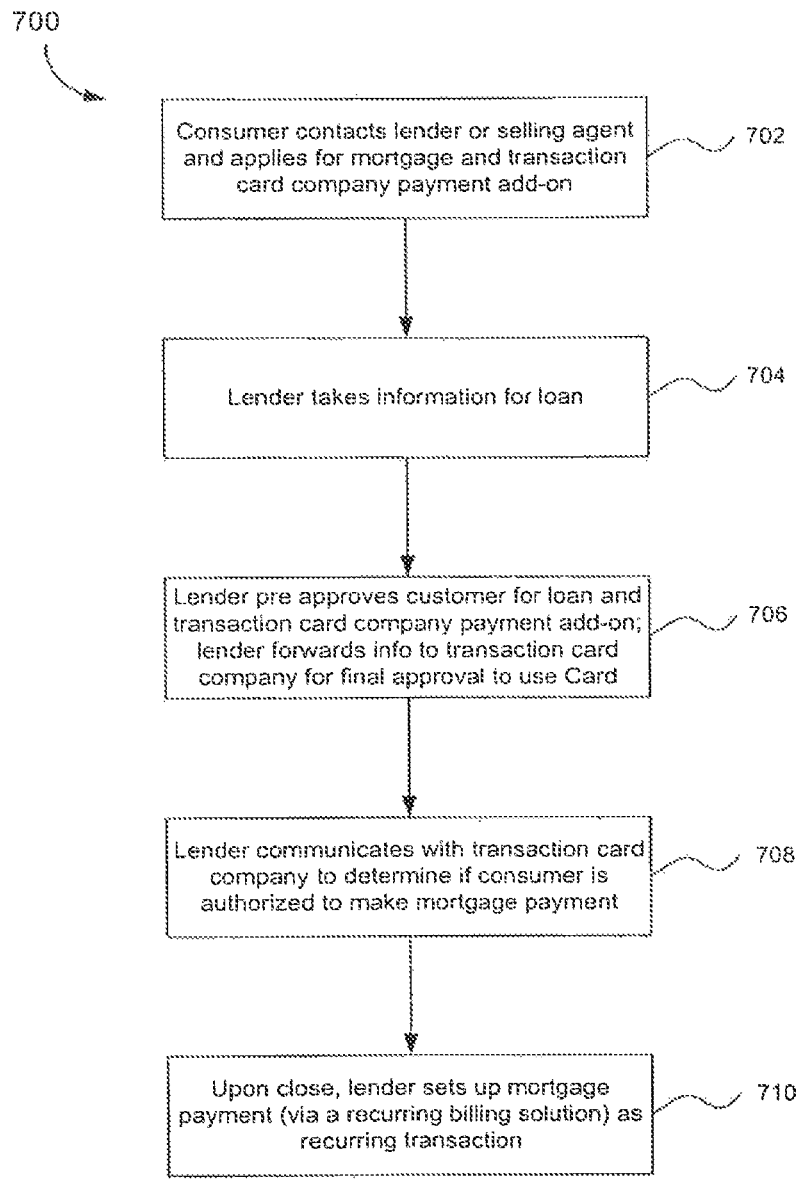
FIGS. 7 and 8 are flowcharts illustrating various processes, according to various embodiments of the present invention.

FIG. 7 shows a flowchart depicting a method 700. In one example, method 300 is a method for using a transaction card account to make recurring loan payments, e.g., mortgage payments. In this embodiment, the customer is known to be a transaction card holder of a transaction card company associated with or partnering with a mortgage company accepting a mortgage application. In step 702, a consumer contacts a lender or selling agent and applies for mortgage that is part of the program and gives the consumer the ability to make their monthly mortgage payments on their transaction card account (e.g., American Express). In step 704, a lender takes information for a loan. In step 706, the lender pre-approves customer for loan. In step 708, the lender contacts the transaction card company (e.g., American Express), either directly via voice authorization or via electronic authorization, to determine if the consumer would be authorized to make the mortgage payment at that point in time. There is no guarantee that the consumer will be able to transact in the future, but the pre-approval should be a good indicator. If the consumer is approved for the loan and is authorized to make the payment, the consumer will receive pre-approval for the Program. In step 710, upon closing of the loan, the lender sets up a mortgage payment (e.g., via a recurring billing solution) as a recurring transaction on the transaction card account.

Figure 8:
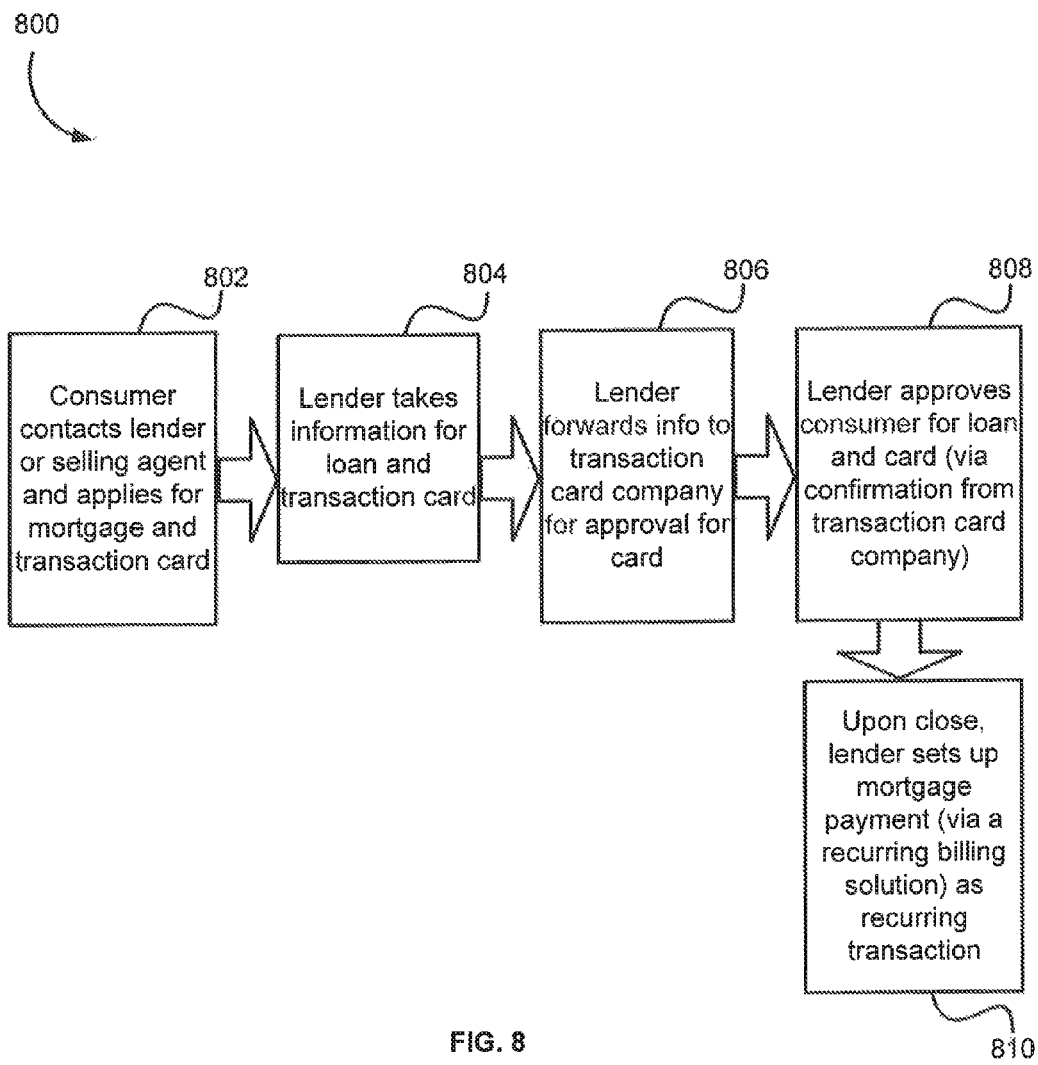

FIG. 8 shows a flowchart depicting a method 800. In one example, method 800 is a method for using a transaction card account to make recurring loan payments, e.g., mortgage payments. In this embodiment, the customer is known to not be a transaction card holder of a transaction card company associated with or partnered with a mortgage company accepting a mortgage application. In step 802, a consumer contacts a lender or selling agent and applies for a mortgage and a transaction card account (e.g., an American Express Preferred Rewards Gold Card). In step 804, the lender takes information for the loan and the transaction card account. In step 806, the lender forwards information to transaction card account company (e.g., American Express) for approval for the transaction card account. Once confirmation of approval is received from the transaction card account company. In step 808 the lender approves the consumer for the loan and the transaction card. In step 810, upon closing of the loan, the lender sets up a mortgage payment (e.g., via a recurring billing solution) as a recurring transaction on the transaction card account.

In one example, for pre-authorization (e.g., step 708 above), normal decision factors (e.g., credit and fraud parameters) many be made more stringent, so that it is harder for existing cardmembers to get authorized to make the monthly mortgage payment. This will help decrease the chances that cardmembers who close a loan through the Program will be declined for their first payment, and possibly also for the ongoing payments associated with the loan.

For new cardmembers, some card issuing companies have limits on spend (e.g., amount one can charge) for the first few months of having the card. Some mortgage payments can exceed this amount, which would normally prevent the potential cardmember applicant from making payments for the loan since the recurring monthly payments could not be immediately charged on the card. However, in one example, these rules are relaxed to allow the new cardmember to incur charges substantial enough to cover, for example, a mortgage payment.

Additionally, or alternatively, if a decision is made that a new or existing cardmember cannot qualify to make a mortgage payment, i.e., risk systems decline a cardmember for a payment, the card issuing company can work with the potential new cardmember or the existing cardmember to remedy the problems associated with the declined payment. For example, if a cardmember is considered higher risk due to certain spending patterns or if they are spending a lot and intend on spending more, this may cause the cardmember to be declined for payment. If this occurs, the card issuing company would contact the cardmember and communication with the cardmember that if they can agree to pre-pay and the transaction card company will proactively reach out to the lender to notify the lender that the cardmember should now be approved for payment if the lender submits the charge against the cardmembers transaction account again. In another example, the cardmember may not be considered high risk, but has spent a lot that month and/or over the course of recent months, if the cardmember communicates that they will not spend anymore that month, the card issuing company will proactively reach out to the lender to notify the lender that the cardmember should now be approved for payment if the lender submits the charge against the cardmembers transaction account again.

Example Implementations

The present invention (i.e., system 100 and processes 235, 350, 460, and 575 in FIGS. 2, 3, 4, and 5, or any part(s) or function(s) thereof) may be implemented using hardware, software or a combination thereof and may be implemented in one or more computer systems or other processing systems. However, the manipulations performed by the present invention were often referred to in terms, such as receiving or comparing, which are commonly associated with mental operations performed by a human operator. No such capability of a human operator is necessary, or desirable in most cases, in any of the operations described herein which form part of the present invention. Rather, the operations are machine operations. Useful machines for performing the operation of the present invention include general purpose digital computers or similar devices.

Figure 6:
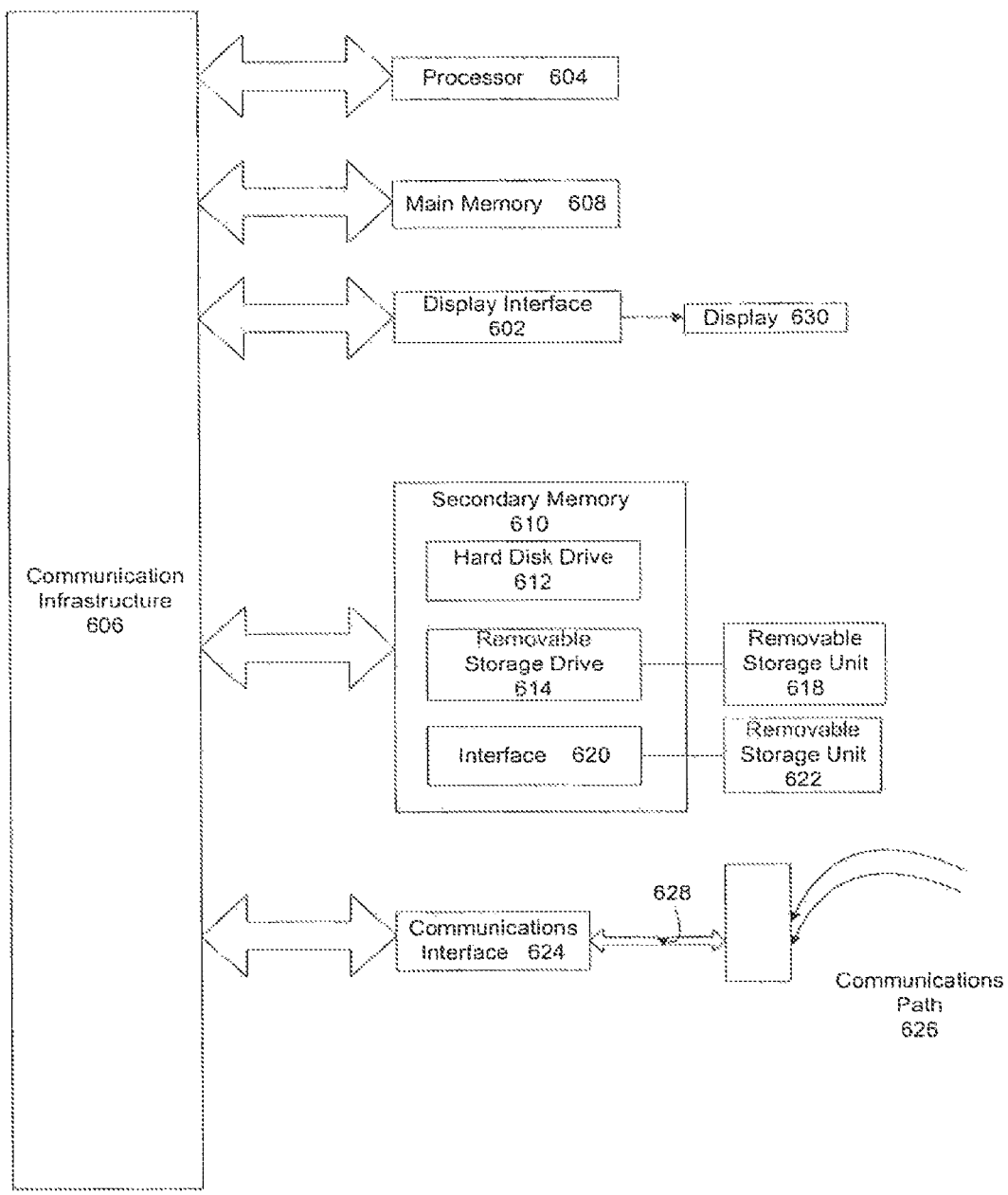
FIG. 6 is a block diagram of a sample computer system that can be used in the implementation of one or more embodiments of the present invention.

In fact, in one embodiment, the invention is directed toward one or more computer systems capable of carrying out the functionality described herein. An example of a computer system 600 is shown in FIG. 6.

The computer system 600 includes one or more processors, such as processor 604. The processor 604 is connected to a communication infrastructure 606 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 600 can include a display interface 602 that forwards graphics, text, and other data from the communication infrastructure 606 or from a frame buffer not shown) for display on the display unit 630.

Computer system 600 also includes a main memory 608, preferably random access memory (RAM), and may also include a secondary memory 610. The secondary memory 610 may include, for example, a hard disk drive 612 and/or a removable storage drive 614, representing a floppy disk drive, a magnetic tape drive, an optical disk drive, etc. The removable storage drive 614 reads from and/or writes to a removable storage unit 618 in a well known manner. Removable storage unit 618 represents a floppy disk, magnetic tape, optical disk, etc. which is read by and written to by removable storage drive 614. As will be appreciated, the removable storage unit 618 includes a computer usable storage medium having stored therein computer software and/or data.

In alternative embodiments, secondary memory 610 may include other similar devices for allowing computer programs or other instructions to be loaded into computer system 600. Such devices may include, for example, a removable storage unit 622 and an interface 620. Examples of such may include a program cartridge and cartridge interface (such as that found in video game devices), a removable memory chip (such as an erasable programmable read only memory (EPROM), or programmable read only memory (PROM)) and associated socket, and other removable storage units 622 and interfaces 620, which allow software and data to be transferred from the removable storage unit 622 to computer system 600.

Computer system 600 may also include a communications interface 624. Communications interface 624 allows software and data to be transferred between computer system 600 and external devices. Examples of communications interface 624 may include a modem, a network interface (such as an Ethernet card), a communications port, a Personal Computer Memory Card International Association (PCMCIA) slot and card, etc. Software and data transferred via communications interface 624 are in the form of signals 628 which may be electronic, electromagnetic, optical or other signals capable of being received by communications interface 624. These signals 628 are provided to communications interface 624 via a communications path (e.g., channel) 626. This channel 626 carries signals 628 and may be implemented using wire or cable, fiber optics, a telephone line, a cellular link, an radio frequency (RE) link and other communications channels.

In this document, the terms "computer program medium" and "computer usable medium" are used to generally refer to media such as removable storage drive 614, a hard disk installed in hard disk drive 612, and signals 628. These computer program products provide software to computer system 600. The invention is directed to such computer program products.

Computer programs (also referred to as computer control logic) are stored in main memory 608 and/or secondary memory 610. Computer programs may also be received via communications interface 624. Such computer programs, when executed, enable the computer system 600 to perform the features of the present invention, as discussed herein. In particular, the computer programs, when executed, enable the processor 604 to perform the features of the present invention. Accordingly, such computer programs represent controllers of the computer system 600.

In an embodiment where the invention is implemented using software, the software may be stored in a computer program product and loaded into computer system 600 using removable storage drive 614, hard drive 612 or communications interface 624. The control logic (software), when executed by the processor 604, causes the processor 604 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s). In yet another embodiment, the invention is implemented using a combination of both hardware and software.

Conclusion

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention). Thus, the present invention should not be limited by any of the above described exemplary embodiments, but should be defined only in accordance with the following claims and their equivalents.

In addition, it should be understood that the figures, which highlight the functionality and advantages of the present invention, are presented for example purposes only. The architecture of the present invention is sufficiently flexible and configurable, such that it may be utilized in ways other than that shown in the accompanying figures.

Further, the purpose of the following Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed:

1. A method comprising:
   processing, by a computer-based transaction account system comprising a processor and a non-transitory, tangible memory, a request to make recurring an automatic, periodic charge to a transaction account of a requestor for a loan based on a previously submitted application from the requestor to a loan company;
   notifying, by the computer-based transaction account system, the loan company responsive to a decline of the automatic, periodic charge;
   receiving, by the computer-based system, prepayment information indicating that the requestor has prepaid at least a partial amount of the automatic, periodic charge; and
   notifying, by the computer-based system, the loan company responsive to the prepayment information relating to the automatic, periodic charge.

2. The method of claim 1, further comprising periodically storing at least one of a reward value or a loyalty point value associated with the automatic, periodic charge in the transaction account.

3. The method of claim 1, wherein the automatic, periodic charge is associated with a mortgage payment.

4. The method of claim 1, wherein the transaction account is a credit based account.

5. The method of claim 1, wherein the loan is associated with the transaction account of the requestor.

6. The method of claim 1, further comprising determining that the requestor is eligible to use the transaction account for the automatic, periodic charges.

7. The method of claim 1, further comprising offering incentives to the loan company to transmit the information of the requestor to the transaction account system.

8. The method of claim 1, wherein the loan comprises a subset of available loans.

9. The method of claim 1, further comprising performing a pre-authorized process of the transaction account.

10. The method of claim 1, further comprising performing a pre-authorized process of the transaction account, in response to the transaction account of the requestor being stored in the transaction account system.

11. The method of claim 1, further comprising requiring, by the computer-based system, that a payment be made to reduce a balance of the transaction account.

12. The method of claim 1, further comprising receiving notification information, by the computer-based system, indicating that the requestor will reduce the requestor's rate of spend on the transaction account.

13. The method of claim 1, further comprising notifying, by the computer-based system, the loan company responsive to an indication of a reduced rate of spend relating to the automatic, periodic charge.

14. An article of manufacture including a non-transitory, tangible computer readable medium having instructions stored thereon that, in response to execution by a computer-based transaction account system, cause the computer-based system to perform operations comprising:
   processing, by the computer-based system, a request to make recurring an automatic, periodic charge to a transaction account of a requestor for a loan based on a previously submitted application from the requestor to a loan company;
   notifying, by the computer-based system, the loan company responsive to a decline of the automatic, periodic charge, wherein the automatic, periodic charge is a request to automatically charge a recurring loan payment amount to a transaction account of a requestor for a loan;
   receiving, by the computer-based system, prepayment information indicating that the requestor has prepaid at least a partial amount of the automatic, periodic charge; and
   notifying, by the computer-based system, the loan company responsive to the prepayment information relating to the automatic, periodic charge.

15. A system comprising:
   a processor configured for managing a transaction account,
   a tangible, non-transitory memory configured to communicate with the processor,
   the tangible, non-transitory memory having instructions stored thereon that, in response to execution by the processor, cause the processor to perform operations comprising:
   processing, by the processor, a request to make recurring an automatic, periodic charge to a transaction account of a requestor for a loan based on a previously submitted application from the requestor to a loan company;
   notifying, by the processor, the loan company responsive to a decline of the automatic, periodic charge, wherein the automatic, periodic charge is a request to automatically charge a recurring loan payment amount to a transaction account of a requestor for a loan;
   receiving, by the processor, prepayment information indicating that the requestor has prepaid at least a partial amount of the automatic, periodic charge; and
   notifying, by the processor, the loan company responsive to the prepayment information relating to the automatic, periodic charge.

* * * * *